United States Patent
Dziedzic

[15] 3,678,748
[45] July 25, 1972

[54] ELECTRICAL SENSING DEVICE FOR MEASUREMENT OF LIQUID METAL

[72] Inventor: Jan Dziedzic, Ul, Pazinskiego 3 C M 5, Warsaw, Poland

[22] Filed: June 18, 1970

[21] Appl. No.: 47,470

Related U.S. Application Data

[63] Continuation-in-part of Ser. No. 779,776, Nov. 29, 1968, abandoned.

[30] Foreign Application Priority Data

Dec. 2, 1967 Poland.................................P 123,861

[52] U.S. Cl. ...........................................73/290 R, 336/170
[51] Int. Cl. ......................................................G01f 23/26
[58] Field of Search ....................73/290 R, 304 R; 323/75 S; 336/170, 171

[56] References Cited

UNITED STATES PATENTS 3,058,345  10/1962  Mastras ....................................73/304

FOREIGN PATENTS OR APPLICATIONS 1,210,998  2/1966  Germany................................73/290
1,243,891  6/1967  Germany................................73/290

*Primary Examiner*—Louis R. Prince
*Assistant Examiner*—Frederick Shoon
*Attorney*—Irvin A. Lavine

[57] ABSTRACT

Sensing device for sensing the level of molten liquid in which four legs of a Wheatstone bridge are wound on two concentric tubes, two opposite legs being spirally wound in pairs along the length of each tube; core material within each two leg windings is ferromagnetic or non-magnetic.

5 Claims, 3 Drawing Figures

ELECTRICAL SENSING DEVICE FOR MEASUREMENT OF LIQUID METAL

CROSS REFERENCE TO RELATED APPLICATION

This application is a continuation-in-part application of Ser. No. 779,776, filed Nov. 29, 1968, and now abandoned.

The present invention relates to an electrical sensing device for detecting the level of liquid metal in hermetically sealed containers under heavy-duty conditions of chemically aggressive atmospheres, at high temperatures and in the gamma and neutron radiation zones. This device has been developed for operation in fast nuclear reactor containers with liquid metal coolant, and may also be of use in chemical industries for detecting liquid metal levels in a tank. The tank need not be unsealed should an impaired sensing device of this type be replaced or repaired.

The heretofore known liquid metal level indicators include resistor, thermo-electric, inductance, ultrasonic and absorption type sensing devices. They have exhibited a number of imperfections, such as small output signal change with change in level; large influence of temperature on measurement results; low output necessitating the use of complicated electronic apparatus for signal amplification, causing high production cost and low reliability.

Putting aside very simple and inexpensive but also very unreliable contact indicators and very complicated ultrasonic and gamma-absorption level indicators, the most frequently encountered indicators are of the induction type.

The method of operation of the induction sensors is based on the measurement of self-induction of a coil. Self-induction changes as liquid metal enters the region of the external or internal magnetic field of the coil and acts like a short-circuiting sleeve of varying cross-section. However, the majority of the induction type sensors utilizes the changes in mutual inductance of two or three coils caused by the same factor.

Practical devices can be divided into two groups. To the first group belong sensors with single or multiple coils whose self-inductance is measured by an automatic compensation method or a relay-comparison method. To the second group belong devices with two or three coils (connected into a differential transformer circuit) whose mutual inductance is a measure of liquid metal level.

Independently of the above described devices, there exist designs of measuring devices employing bridge circuits. In one particular case of a bridge magnetometer as disclosed in U.S. Pat. No. 2,632,883 for Magnetometer System of Max S. Richardson there is an embodiment with two cores, each with two windings. However, that configuration differs fundamentally from this invention, since there are two mechanically independent cores, while in this invention there are coaxial cores, separated by a double winding.

An object of this invention is to provide a sensing device whose construction could meet all the currently known requirements with regard to mechanical and measuring characteristics, including simplicity of construction and economy of manufacture.

The specific constructional features of the sensing device according to the invention consist in the fact that four winding legs are wound in pairs and in two layers, with a ferromagnetic core located between these layers, the legs extending concentrically to a central axis, as wound. Winding legs are so interconnected to provide a Wheatstone quadruple-arm bridge circuit so that the ampere-turns of each winding may sum up along the device center line. In the interlayer core, the magnetometive force difference of both layers is produced.

The sensing device according to the invention when employed in an electric liquid-level indicator designed for the measurement of liquid metal levels under high temperature conditions prevailing in hermetically sealed metal vessels basically is of simplified construction since there is avoided the need for higher-frequency oscillators and amplifiers on account of a high bridge output level.

An electric liquid-level indicator incorporating a sensing device according to the invention includes a main transformer for supplying the sensing bridge, providing control of the rectified and filtered output signal, and a magnetoelectric indicator or recorder calibrated in units of length.

IN THE DRAWINGS

Figure 2:
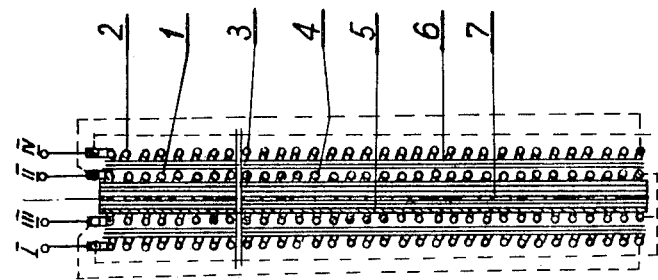
FIG. 2 is a cross-sectional view, partly schematic, of the present sensing device.
Figure 1:
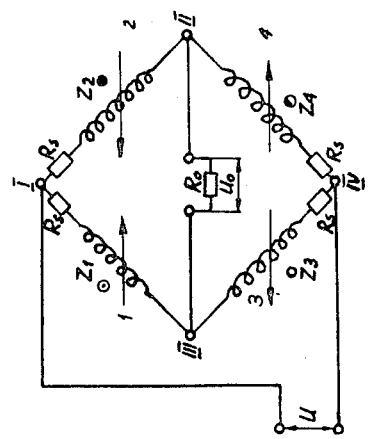
FIG. 1 is a circuit diagram of the present sensing device, with winding leg symbols.

The present invention sensing device has four winding legs 1, 2, 3 and 4, a supporting tube 5 having a longitudinal slot along its entire length with an internal central core 7 and an interlayer core 6 surrounding the tube 5. Legs 1 and 4, as seen in FIG. 1, form the opposite sides of a Wheatstone bridge, and are spirally wound as a pair along the length of tube 5, as shown in FIG. 2. Similarly, legs 2 and 3 form opposite sides of the Wheatstone bridge, and are spirally wound as a pair along the length of core 6, and are coaxial with the legs 1 and 4 on tube 5.

These opposite side of the Wheatstone bridge windings provide a complete electromagnetic coupling. To establish the Wheatstone bridge circuit as shown in FIG. 1, suitable connections are provided which are diagrammatically illustrated by the dashed lines on FIG. 2. By way of example, leg 1 is connected to a suitable connector device at its upper end, which corresponds to junction III of the Wheatstone bridge, and its lower end is connected by means of a suitable conductor, illustrated by a dashed line, to another suitable connector device which corresponds to junction I of the Wheatstone bridge. Their connecting conductors extend from the lower end of each of the four legs 1, 2, 3 and 4 to establish the Wheatstone bridge circuit, and do not interfere with the current flow or the magnetic flux.

In the central core 7 and outside the sensing element there is a flow of magnetic flux produced by the sum of the magnetometive forces deriving from all of the windings, whereas in the interlayer core 6 there is magnetic flux produced by the difference of ampere-turns of winding leg pairs 1 and 4, and 2 and 3.

Cores are made of a ferromagnetic material whose magnetic transition temperature (Curie point) is approximately 20 percent higher than the expected maximum working temperature in degrees centigrade, or of a non-magnetic material, and therefore the maximum working temperature of the sensing device is dependent only on the thermal strength of the structure, wiring and insulation.

Figure 3:
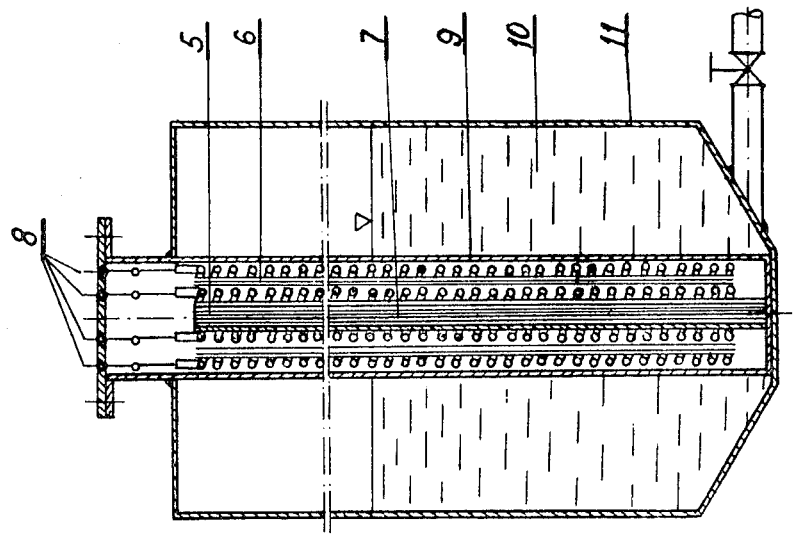
FIG. 3 is a cross-sectional view of the device of FIG. 2 in a housing within a liquid metal vessel.

The sensing device is housed within a cylindrical enclosure 9, as shown in FIG. 3, wherein it is shown mounted in tank or vessel 11 containing liquid metal 10; the part of the cylindrical enclosure 9 that extends above the vessel 11 ends in a multiple-contact electric joint 8 used to feed supply voltage U and to transmit output signal $U_o$.

The principle of operation is as follows: The liquid metal, similar to a short-circuiting sleeve, acts on the resultant flux of all winding legs. As the molten liquid level increases, the energetic load, chiefly of the outer layer winding legs rises also. The magnetic flux deriving from the inner layer winding legs closes the loop through the central core 7 and interlayer core 6 doing it in relation to the intensity of the load of the outer layer winding legs. A drop in voltage due to the load rising in the outer layer winding legs is accompanied by a rise of voltage in the inner layer winding legs. Considering the sensing element as an alternating current bridge which in its state of balance has the relationship $Z_1 = Z_2 = Z_3 = Z_4$, where $Z$ = the impedance of a bridge arm, an output signal $U_o$ is obtained which is directly proportional to the level of metal in the vessel or tank, relationship existing between supply voltage U, output signal $U_o$ and variable element is: $U_o = U \, \Delta Z/Z$ with $U =$ const...

A modification of the above disclosed electrical sensing device for the measurement of liquid-metal levels in which the cores 6 and 7 are of magnetic material, and the cylindrical enclosure 9 is filled with an inert atmosphere, provides a device having a maximum working temperature of up to 800° C.

It will be obvious to those skilled in the art that various changes may be made without departing from the spirit of the invention and therefore the invention is not limited to what is shown in the drawings and described in the specification but only as indicated in the appended claims.

I claim:

1. An electrical sensing device for sensing the level of molten metal in a tank comprising:
    a supporting tube having a core therein,
    a core surrounding said tube, and windings on said tube and surrounding core consisting of four legs connected to provide a Wheatstone bridge, first and fourth legs of said windings being opposite legs of said bridge and wound spirally in pairs along the length of said tube, said second and third legs of said windings being wound spirally in pairs along the length of said surrounding core and being opposite legs of said bridge.

2. The device of claim 1, said cores being of ferromagnetic material.

3. The device of claim 1, at least one of the said cores being nonmagnetic material.

4. The device of claim 3, wherein said one core is said core within said tube.

5. The device of claim 1, said tube having a longitudinal slit along substantially the entire length thereof.

* * * * *